Dec. 18, 1962 W. R. SLOAN 3,069,681

SYSTEM FOR LARGE-AREA DISPLAY OF TWO-COLOR INFORMATION

Filed March 14, 1960

3 Sheets-Sheet 1

INVENTOR.
WILLIAM R. SLOAN

BY Gust & Irish

ATTORNEYS

Dec. 18, 1962 W. R. SLOAN 3,069,681

SYSTEM FOR LARGE-AREA DISPLAY OF TWO-COLOR INFORMATION

Filed March 14, 1960 3 Sheets-Sheet 2

INVENTOR.
WILLIAM R. SLOAN

BY Gust & Irish

ATTORNEYS

Dec. 18, 1962 W. R. SLOAN 3,069,681

SYSTEM FOR LARGE-AREA DISPLAY OF TWO-COLOR INFORMATION

Filed March 14, 1960 3 Sheets-Sheet 3

INVENTOR.
WILLIAM R. SLOAN

BY Gust & Irish

ATTORNEYS 3,069,681
SYSTEM FOR LARGE-AREA DISPLAY OF TWO-COLOR INFORMATION

William R. Sloan, Fort Wayne, Ind., assignor to International Telephone and Telegraph Corporation
Filed Mar. 14, 1960, Ser. No. 14,743
9 Claims. (Cl. 346—74)

This invention relates to a system for presenting in two colors alpha-numeric information, i.e., words and numbers, and graphical information, such as maps, graphs, etc., visually on a large-area display for group viewing.

There are occasions when it is desirable visually to display various types of printed and/or graphical information on a large-area surface to permit viewing thereof by a number of persons, and it may further be desirable to display such information in two separate colors, e.g., black and red. In the past, such large-area displays have been provided by conventional optical projection techniques which generally required a darkened room for optimum viewing and further involved substantial power requirements. Furthermore, in instances where the alpha-numeric or graphical information to be displayed is in the form of coded electrical characteristics, optical projection requires the intermediate step of printing the information before it can be optically projected, and likewise, graphical information conventionally requires transfer to a transparency for best optimum projection.

In application Serial Number 18,008, filed March 28, 1960 of Eugene S. Hawkins, which is assigned to the assignee of the present application, there is described a system for large area display of alpha-numeric and graphical information which does not employ optical projection techniques. In accordance with the invention of that application, a printed page or a rectangular graphical display is divided into a matrix comprising a predetermined number of discrete dots, the number depending upon the resolution required, e.g., much in the nature of a newspaper half-tone. Thus, the area to be viewed is divided into incremental areas, such as 1,000 dots horizontally and 1,000 dots vertically to provide a potential of 1,000,000 dots. In order to display the information in dot form, the horizontal dimension of the display surface is divided into a number of discrete incremental segments and one horizontal line of the alpha-numeric or graphical information is formed by sequentially scanning the line and forming dots where marks are required. Thus, the horizontal dot-forming mechanism and the display surface are moved vertically with reference to each other as scanning is repeated to form a rectangular display, much in the nature of a television raster. In the preferred embodiment of the above-referred to Hawkins' application, the display surface is in the form of an endless belt of dielectric material and the dots are formed by well known xerographic techniques.

The system described and illustrated in the aforementioned Hawkins' application displays information in only one color, and therefore it is an object of my present invention to provide a system of the general type disclosed in the Hawkins' application for displaying information in two colors.

In accordance with the broader aspects of my invention, therefore, I provide means for receiving information and for converting the same into two time-based signals respectively responsive to the information in the two colors. The display surface is in the form of a relatively thin sheet of transparent dielectric material and means including first and second pluralities of electrodes are provided cooperating with the dielectric material sheet to form incremental electrostatic charges in dot form when the electrodes are respectively pulsed. Each of the pluralities of electrodes is in spaced-apart alignment along one dimension of the sheet and the two pluralities of electrodes are respectively spaced-apart along the other dimension of the sheet. Means are provided for moving the sheet with respect to the electrodes along the other dimension. First switching means is provided sequentially coupling the first electrodes to the converting means for sampling one of the color-responsive signals at discrete intervals and for pulsing the first electrodes responsive to the presence of the one color signal at the respective intervals. Second switching means is provided sequentially coupling the second electrodes to the converting means for sampling the other of the color-responsive signals at discrete intervals and for pulsing the second electrodes responsive to the presence of the other color signal at the respective intervals. First and second means for applying charged toner material of two different colors respectively are provided, one color being applied to one side of the sheet and the other color being applied to the other side of the sheet. Thus, the first sequential switching means and its associated toner applying means may form black dots on the outer surface of the dielectric sheet while the second sequential switching means and its associated toner applying means may form red dots on the inner surface of the sheet. The red toner material applied to the inner surface of the sheet will, of course, adhere to the incremental charged areas formed by the first switching means; however, they will be masked by the opaque black toner material previously applied to these incremental areas on the outer surface of the sheet. Thus, the rod dots formed on the inner surface of the sheet will be visible for viewing through the transparent sheet only in those areas where incremental charges were not formed by the first switching means and first electrodes.

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is a block diagram illustrating one embodiment of my invention for presenting alpha-numeric information in two colors.

Figure 1:
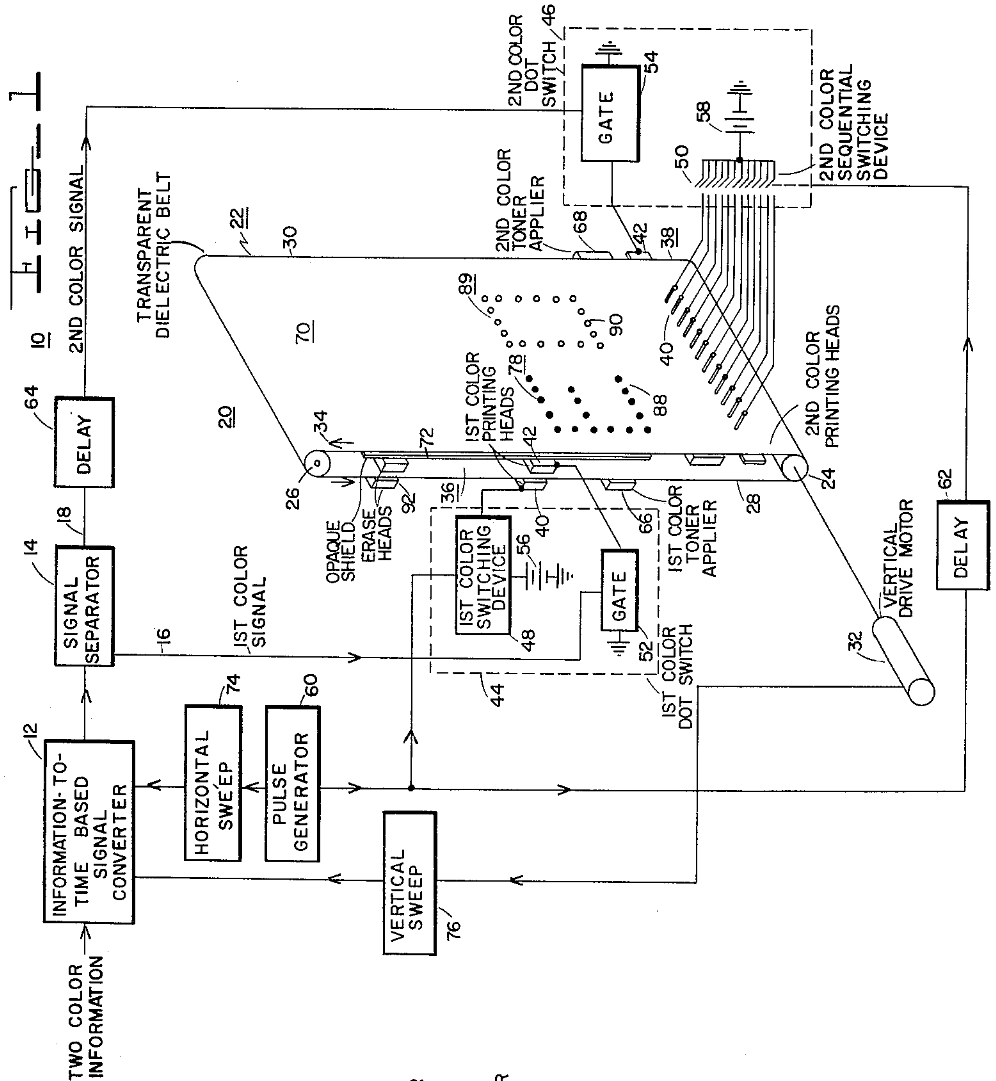
FIG. 1 is a schematic illustration in block diagram form showing the fundamentals of my invention.
Figure 2:
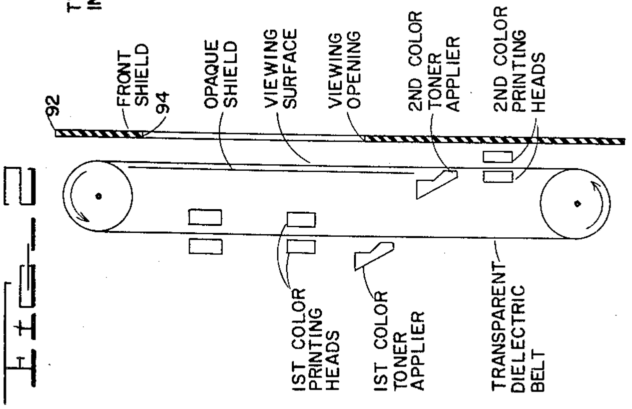
FIG. 2 is a side-elevational view of the display means of FIG. 1.
Figure 2:
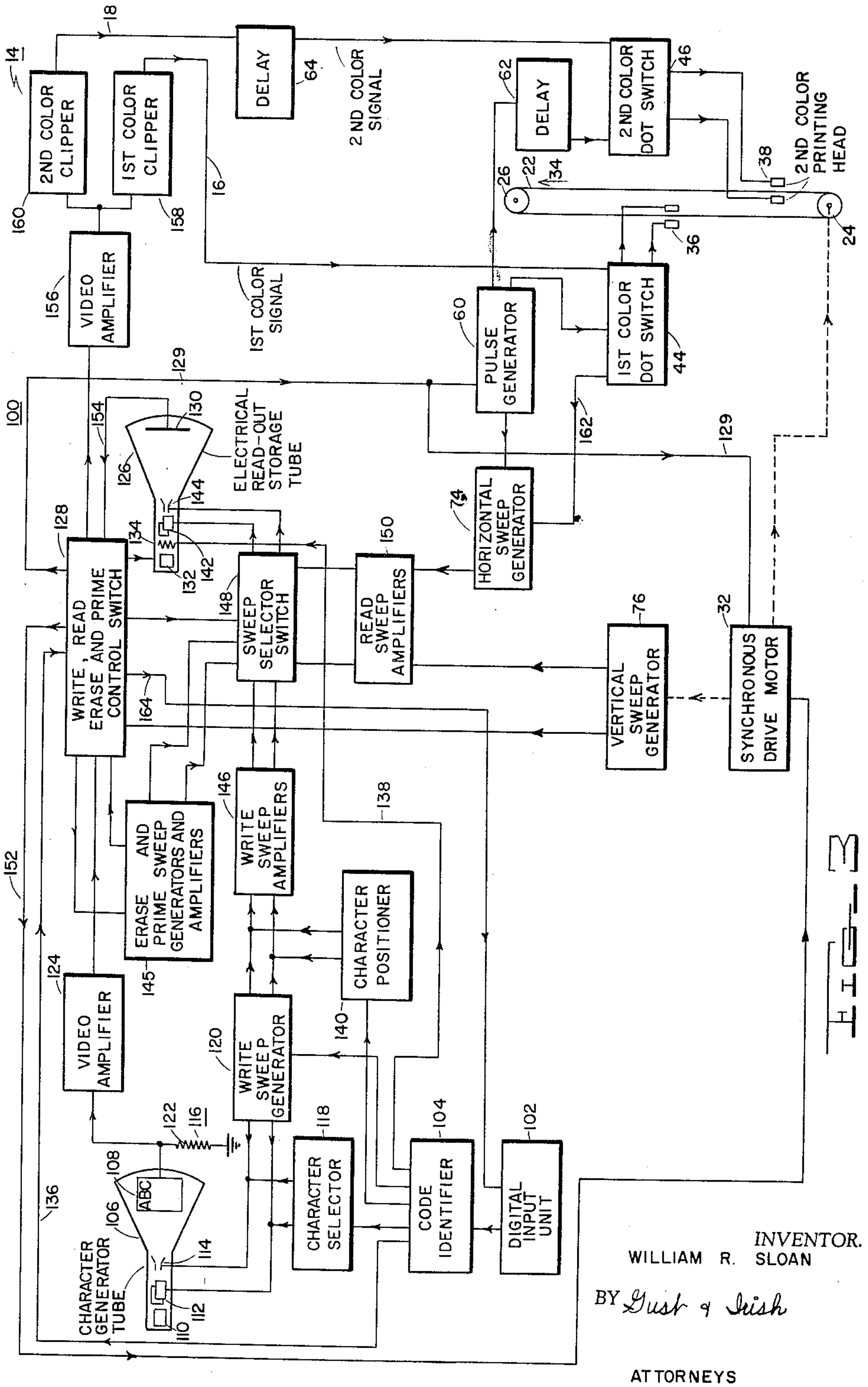

Referring now to FIGS. 1 and 2 in which the broader aspects of my invention are illustrated, my improved system for large-area display of alpha-numeric and graphical information, generally identified at 10 comprises converter 12 which receives the alpha-numeric or graphical information and converts the same into a first time-based electrical signal having characteristics respectively responsive to the information in the two colors. If alpha-numeric information is to be displayed, the input information may be in digital form, i.e., a pulse code from a computer or teletype coded as to character, position and color. Converter 12 would then include means for decoding the digital input to identify the particular characters, their respective locations on the page to be displayed, and their respective colors. Converter 12 will also include a character generating device, such as a monoscope tube, for providing a time-based video signal corresponding to the input character. Since the input rate of the system 10 may be considerably faster than the printing rate, it will also be desirable to provide storage means in converter 12 to store the character-responsive signals for subsequent reading-out at a slower speed consistent with the capabilities of the printing apparatus. The signals may be stored in the storage means at two different levels responsive to the two different input colors, and likewise subsequently read-out at two different levels. Graphical information may also be in coded digital form, or may be fed directly into the system in the form of X—Y voltages at levels corresponding to the two colors.

The first time based signal provided by the converter 12 is fed to a signal separating circuit 14 which separates the first time-based signal into two time-based signals respectively corresponding to the two color characteristics in the first time-based signal. Thus, if the first time-based signal provided by converter 12 has two different levels corresponding respectively to the two-color input information, signal separator 14 may comprise two clipping circuits which respectively clip the first time-based signal to provide in output circuits 16 and 18 first and second time-based color signals, respectively corresponding to the two-color information.

The large-area display means 20 of my invention comprises an endless belt 22 formed of relatively thin transparent dielectric material, such as Mylar, which is trained around rollers 24 and 26 to provide parallel runs 28 and 30, as shown. The lower roller 24 may be driven by synchronous drive motor 32 thus to move the belt 22 in the direction shown by the arrows 34.

In order to "print" the information on dielectric belt 22 in the desired two colors, I provide first and second color printing heads 36 and 38 respectively cooperating with the two runs 28 and 30 of belt 22. The printing heads 36 and 38 extend transversely across belt 22, i.e., transverse with respect to the direction of movement 34 of the belt. In the simplest form, shown in FIG. 1, each of the printing heads 36 and 38 comprises a plurality of incremental charge-forming electrodes 40 in spaced apart alignment and respectively spaced from the outer surface of belt 22 and another electrode 42 on the inner surface of the belt 22 and spaced therefrom, cooperating with the plurality of electrodes 40.

First and second color dot switches 44 and 46 are provided respectively comprising first and second color sequential switching devices 48 and 50 and gate devices 52 and 54. Switching devices 48 and 50 sequentially connect the respective dot-forming electrodes 40 to a suitable source of positive potential, shown here as batteries 56 and 58, while gates 52 and 54, when actuated, connect the respective electrodes 42 to ground, as shown.

Sequential switching devices 48 and 50 are actuated by pulses provided by pulse generator 60, the pulse generator 60 being directly coupled to the first color switching device 48 and being coupled to actuate the second sequential switching device 50 through delay circuit 62 which delays the pulses provided by pulse generator 60 at a time equal to the time required for a point on belt 22 to move in the direction shown by the arrows 34 from the first printing heads 36 to the second printing heads 38; this time delay is necessary in order to provide registry of the two-color information printed on the belt 22. Gate 52 is directly connected to output circuit 16 of signal separator 14 and thus will be actuated in the presence of the first color signal. Gate 54 is coupled to output circuit 18 of signal separator 14 by delay circuit 64 providing the same time delay as delay circuit 62, and thus gate 54 is actuated responsive to the presence of the delayed second color signal. Assuming then that the first color signal is present in the output circuit 16 of signal separating circuit 14 thereby actuating gate 52, each successive pulse provided by pulse generator 60 results in sequential connection of the next successive electrode 40 of printing head 36 to battery 56 thereby pulsing dielectric belt 22 successively to form incremetal charges in dot form thereon. The action of the second color dot switch 46 is identical.

The first color toner applicator 66 is provided spaced from printing heads 36 in the direction of movement 34 of belt 22 and is arranged to apply a first color charged toner, for example black, on the outer surface of dielectric belt 22. A second color toner applicator 68 is spaced from printing heads 38 in the direction of movement 34 of belt 22 and is arranged to apply a second color charge toner, for example red, on the inner surface of the dielectric belt 22; it will be observed that the first color toner is applied to the outer surface of run 28 of belt 22 whereas the second color toner is applied to the inner surface of run 30 of belt 22 so that it is not required to make contact with the roller 24. The area 70 of run 30 of belt 22 forms the viewing area, and an opaque shield 72 is provided spaced from the inner surface of area 70 of belt 22 in order to enhance the viewing characteristics.

The signal converter 12 provides the first time-based output signal in raster form, i.e., having both a horizontal and vertical time-based characteristic. To provide the horizontal and vertical time-based characteristic in the first time-based signal provided by converter 12, horizontal and vertical sweep generators 74 and 76 are provided respectively coupled to the converter 12. Horizontal sweep generator 74 is coupled to pulse generator 60 and synchronized thereby so that a new horizontal sweep of converter 12 is initiated responsive to the completion of one complete sequential connection of electrodes 40 of scanning head 36 to battery 56. Likewise, vertical sweep generator 76 is coupled to vertical drive motor 32 and synchronized thereby, thereby to synchronize the vertical sweep of converter 12 with the vertical movement of the belt 22.

Assuming now that the first time-based signal during the first one-half of the first horizontal scan thereof is calling for black information, which may be a component of the black "E" shown at 78 on belt 22, only the first color signal will be present in the first output circuit 16 of signal separator 14 and there will be no output signal in the output circuit 18. Thus, during this period, gate 52 will be open responsive to the presence of the first color signal in output circuit 16 of signal separator 14 and therefore sequential connection of the first five dot-forming electrodes 40 of printing head 36 to battery 56 will result in the formation of a horizontal row of five incrementally charged areas in dot form, which, after the belt passes the black toner applicator 66 will have black toner material adhered thereto forming the row of dots 88. Proceeding, it is now assumed that after a brief interval in which no information is provided in the first time-based signal provided by converter 12, the signal now calls for a red output. Thus, there will be no first color signal in output circuit 16 of signal separator 14 but there will be a second color signal provided in output circuit 18. Thus, after the delay provided by delay circuit 64, gate 54 will be opened at the time the first row of dots 88 has reached the printing head 38. The pulses provided by pulse generator 60 as delayed by delay circuit 62 will now sequentially connect the 7th through 11th electrodes 40 of printing head 38 to battery 58, and thus, since gate 54 is open during this period due to the presence of the second color signal, incremental charges in dot form will be provided on belt 22. After these charges pass red toner applicators 68, the red toner material will adhere to the incrementally charged areas providing the row of red dots 90, which may form the first line of the letter "O," indicated at 89, these red dots being formed on the inner surface of belt 22, but being visible therethrough. It will be readily comprehended that the red toner material provided by the red toner applicator 68 will also adhere to the incrementally charged areas provided by the first printing head 36, however, the black toner material applied by the black toner applicator 66 is opaque, and since it is applied on the outer surface of the belt 22, the red toner material applied on the other surface, e.g., on the reverse side of belt 22 from dots 88 will not be visible.

In order to erase the information "printed" on belt 22, a pair of suitable erasing heads 92 are provided cooperating with run 28 of belt 22 and spaced from the first color printing heads 36 in the direction opposite from the direction of movement 34 of belt 22. Erase heads 92 apply a charge on the belt 22 having a polarity opposite from the incremental charges forming the dots and thus the belt is discharged and the toner material which is adhered to the incrementally charged areas is brushed therefrom. It will be observed that while the previous page of information is being erased, the first color printing head 36 is operative to begin the application of a new electrostatic image of the first color on belt 22 to form a new page of two-color information. It will be seen that the belt may be stopped when a complete page of information appears in the viewing area 70, or in the alternative, motion of the belt may be continuous and information continuously printed thereon and subsequently erased therefrom. It will also be readily apparent that it may be desirable to skew the printing heads 36 and 38 slightly in order that the dots printed thereby may appear horizontally on the viewing surface 70 of belt 22. As best seen in FIG. 2, an opaque front shield 92 may be provided having a viewing opening 94 therein which exposes only the display surface 70 of belt 22. While printing heads 36 and 38 are shown as being formed of a single row of dot-forming electrodes, it will be readily apparent that each printing head 36, 38 may be in the form of a dot matrix, containing enough dots completely to form any of the required characters or symbols.

Referring now to FIG. 3 in which like elements are indicated by like reference numerals, I have shown my invention as embodied in a system of the type described and illustrated in the aforesaid Hawkins' application, the illustrated system being intended for the large-area display of alpha-numeric information. This system, generally identified as 100, comprises input unit 102 which provides the input information in digital form, i.e., a pulse code in which the character, position of the character on the page, and the desired color are all included in the coded information. Digital input unit 102 may be a computer, a teletype machine, or a device of the type manufactured by Frieden, Inc., referred to by the tradename "Flex-O-Writer." Digital input unit 102 is coupled to code identifier or decoding unit 104 which separates the character identifying portion of the coded digital input from the position identifying portion and the color identifying portion. The position identifying porton of the digital input code may merely indicate that the system is to operate in a typewriter mode of operation, i.e., letters printed from left to right, line after line until a full page is completed; or it may identify a particular location or locations on the page for particular characters or symbols.

Generation of time-based signals responsive respectively to the input characters is accomplished by a character generator tube 106, which in the illustrated embodiment may be a monoscope tube of the type manufactured by Vacuum Tube Products Division, Hughes Aircraft Co. In this tube, 64 characters and symbols (letters, numerals, punctuation, etc.) or more, are printed on aluminum target 108 in ordinary printer's ink in horizontal and vertical rows. Tube 106 is provided with electron gun 110 and horizontal and vertical deflection elements 112 and 114 which cooperate to scan the electron beam produced by the gun 110 over the target 108. The time-based output signal corresponding to any preselected character is provided in output circuit 116 of tube 106 by initially positioning the electron beam on the desired character and then scanning the character in raster fashion. In order to select the particular character and to position the beam thereon, code identifying unit 104 is coupled to character selector unit 118 which in turn is respectively coupled to horizontal and vertical beam deflection elements 112 and 114 of tube 106. Character selector 118 thus converts the character code into corresponding horizontal and vertical deflection voltages, thereby positioning the electron beam from electron gun 110 to the proper location on target 108 for the particular character called for by the digital code. In order to provide the raster scanning of the particular character, sweep generators 120 are provided coupled respectively to horizontal and vertical beam deflection elements 112 and 114 of tube 106 and providing a delta *x*-delta *y* sweep voltage respectively superimposed on the position voltages provided by character selector 118. The delta *x*-delta *y* sweep voltages provided by sweep generators 120 cause the electron beam in tube 106 to be scanned over the particular character selected in a television-type raster of sufficient size to cover only the selected character on the target 108. The electron beam provided by electron gun 110 has a constant intensity and as it is scanned across the selected character on the target, the secondary emission current from the target is modulated since the aluminum target and the ink from which the characters are formed exhibit different secondary emission coefficients. Since the target current is equal to the difference between the constant intensity beam current and the varying secondary emission current, the character modulation appears across the output load resistor 122. The character video signal in the output circuit 116 of character generator tube 106 is amplified by video amplifier 124 and applied to the writing signal input circuit of electrical read-out storage tube 126 by write-read-erase and prime control switch 128.

Storage tube 126 is preferably a high resolution electrical output recording storage tube, such as Raytheon type QK685. Storage tube 126 is necessary in the system of FIG. 3 since the system as thus far described is capable of receiving digital input information at the rate of 30,000 characters per second, or 4,000 characters in 133 milliseconds, whereas ten seconds is required for visual display of 4,000 characters, thus a complete page of information containing as many as 4,000 characters can be written into the storage electrode 130 of tube 126 at a very fast rate and subsequently read-out at a slower rate compatible with electrostatic printing apparatus. Operation of the recording storage tube 126 involves priming, writing, reading and erasing. Priming is accomplished by uniformly charging storage electrode 130 by reducing the collector screen voltage below the critical potential and scanning the storage electrode 130 with an electron beam provided by gun 132 in raster fashion. In the writing operation, the bias of control grid 134 is set at cut-off and the signal to be stored is applied. In the reading operation, the control grid bias is set to permit beam current and the storage screen voltage is adjusted so that the stored signal will modulate the beam with the output then being taken from the signal electrode portion of the storage electrode. Erasing operation is performed by writing a direct current signal into the tube, thus normalizing the storage electrode 130 at full modulation level with the signal electrode and the storage screen voltage being the same. The mode of operation of the electrical output storage tube is well known to those skilled in the art, and control of the prime, write, read and erase functions is accomplished in the illustrated embodiment by switching unit 128. Code identifying unit 104 is coupled to the switching unit 128 by connection 136 and thus provides a signal thereto at the beginning of the input code group which initiates writing operation of the storage tube 126 which has been previously primed as hereinafter described.

In the illustrated embodiment, code identifying unit 104 is coupled to grid 134 of storage tube 126 by connection 138 in order to control the beam intensity during writing operation and thus the stored signal level responsive to the color code. Thus, during writing operation, characters which the code identifies as black are stored at one level and characters which the code identifies as red are stored at a second level. The selected character signals from the character generator tube 106 are written on the storage electrode 130 of the storage tube 126 at positions determined by the position code, as identified by the code identifying unit 104. Code identifying unit 104 is coupled to character positioning unit 140 and if the input digital code indicates the typewriter mode of operation, character positioner unit 140 will provide horizontal and vertical "stair-step" beam deflection voltages for storage tube 126 which will sequentially position the beam provided by gun 132 from left to right and top to bottom. If, one the other hand, the input digital code calls for selective character positioning at preselected locations on the page, character positioning unit 140 will provide the requisite vertical and horizontal beam positioning deflection voltages for the storage tube 126. Character positioning unit 140 is coupled to horizontal and vertical beam deflection elements 142 and 144 of storage tube 126 by a sweep amplifier 146 and sweep selector switch 148. Sweep selector switch 148 is actuated by switch 128 to connect beam deflection elements 142 and 144 of storage tube 126 to character positioning unit 140 during writing operation and to other sweep generating means during reading, erasing and priming operations, as will be hereinafter described. The delta *x*-delta *y* sweep generators 120 also are coupled to sweep amplifiers 146, and it will thus be seen that the writing beam in storage tube 126 is initially positioned on the storage electrode 130, at the proper position called for by the input digital code, and then swept in raster fashion to write the selected character from the character generator tube 106 onto the storage electrode 130 at one of two levels selected by the code identifier 104 responsive to the color code in the input digital code. It will be seen that the horizontal and vertical saw-tooth or delta *x*-delta *y* writing sweeps of the electron beam of storage tube 126 provided by electron gun 132 are similar in shape and identical in time to the character scanning sweeps of the character generator tube 106.

Assuming now the typewirter mode of operation, it will be seen that after the first character has been completely written into the storage electrode 130 of storage tube 126 at a level determined by the color code, character positioner 140 will advance the line scanning sweep one horizontal step so that another character may be written onto the storage electrode 130. This continues sequentially until the complete horizontal line has been written on the storage electrode 130, at which point the horizontal line scanning is returned to its starting point and the vertical page scanning sweep is advanced one step downward. The page scanning continues to advance one line at a time after each horizontal line is completed until the page is finished. The end of the page is indicated in the input digital code, and thus code identifying unit 104 will provide a signal to switch 128 and to character positioner 140 indicating the end of the page so that the writing beam of the storage tube 126 is blanked off, sweep selector switch 128 is actuated to switch from writing to reading operation, and storage tube 126 is changed from writing to reading operation.

Read-out of the stored data on the storage electrode 130 of storage tube 126 is accomplished by scanning the storage electrode 130 with the electron beam from electron gun 132 with a television-type raster large enough to cover the entire page of stored information. Linear saw-tooth sweep voltages are employed for both the horizontal and vertical scans, the horizontal sweep voltages during reading operation being provided by horizontal sweep generator 74 and the vertical saw-tooth voltage being provided by the vertical sweep generator 76. Horizontal and vertical sweep generators 74 and 76 are coupled to the horizontal and vertical deflection elements 142 and 144 of storage tube 126 during reading operation by sweep selector switch 148 and sweep amplifiers 150. The switch 128 is connected to the synchronous drive motor 132 by a connection 152 and thus initiates operation of synchronous drive motor 132 to cause movement of the belt 22 in the direction shown by the arrows 34 when switch 128 changes from writing to reading operation.

The output circuit 154 of storage tube 126 is coupled during reading operation by switch 128 to video amplifier 156 and to signal separating means 14 which, in the illustrated embodiment, comprises first and second signal clipping circuits 158 and 160 which respectively separate the first and second color output signals as hereinbefore described. Thus, for example, the black information may be written into tube 126 at a level of four volts and the red information may be written at a level of three volts. During read-out operation of the storage tube 126, the two-color information is separated by clippers 158 and 160, clipper 158 being biased to pass all signals above 3.5 volts (black information), and clipper 160 being biased to pass all information above 2.5 volts (both black and red information), the two signals then being subtracted to provide the red information alone. The first, or black color clipper 158 is thus coupled to the first color dot switch 44 while the second, or red, color clipper 160 is coupled to the second color dot switch 46 by the signal delay circuit 64, the display and printing portion of the system of FIG. 3 being as described in connection with FIGS. 1 and 2, above.

When dot switch 44 has completed one sequential sampling of the output signal from storage tube 130 thereby providing one horizontal line scan of belt 22, a trigger signal is provided to horizontal sweep generator 74 by a connection 162 in order to initiate a new horizontal sweep of the reading electron beam on the storage tube 126. Vertical sweep generator 76 which is synchronized with synchronous drive motor 32 may be a simple potentiometer which thereby provides the vertical sweep voltage for the storage tube 54 in synchronism with drive motor 32 during the read-out operation. Potentiometer 76 may also be coupled to switch 128 by connection 164 thereby to provide an actuating signal thereto at the end of one complete vertical scan of the storage electrode 130 of storage tube 126 thereby to actuate switch 128 successively to erase, prime, and write operation. Control switch 128 may be coupled to the digital input unit 102 to provide a trigger signal thereto at the end of the vertical priming scan of the storage tube 126, thereby indicating that the complete page of stored information has been read out of the storage tube and displayed and thus that a new page of input information may be read into the character generator tube 106.

It will be seen that actuation of the switch 128 from reading to erase and priming operation will, by virtue of connection 129, turn off pulse generator 60 and the synchronous drive motor 32, thus terminating operation of dot switches 44 and 46, horizontal sweep generator 74 and the dielectric display belt 22. Actuation of control switch 128 from read-out to erase and prime likewise changes switch 148 from reading to erase and prime operations, thereby connecting deflection means 142 and 144 of storage tube 126 to erase and prime sweep generators and amplifiers 145 in order to prepare the storage tube for writing the next page of information onto the storage electrode 130. On completion of the priming operation, erase and prime sweep generators and amplifiers 67 actuate switch 128 thereby in turn actuating switch 148 connecting deflection means 142 and 144 of storage tube 126 to character positioner 140 and sweep generators 120 in order to write the next page of information onto the storage electrode 130.

Figure 4:
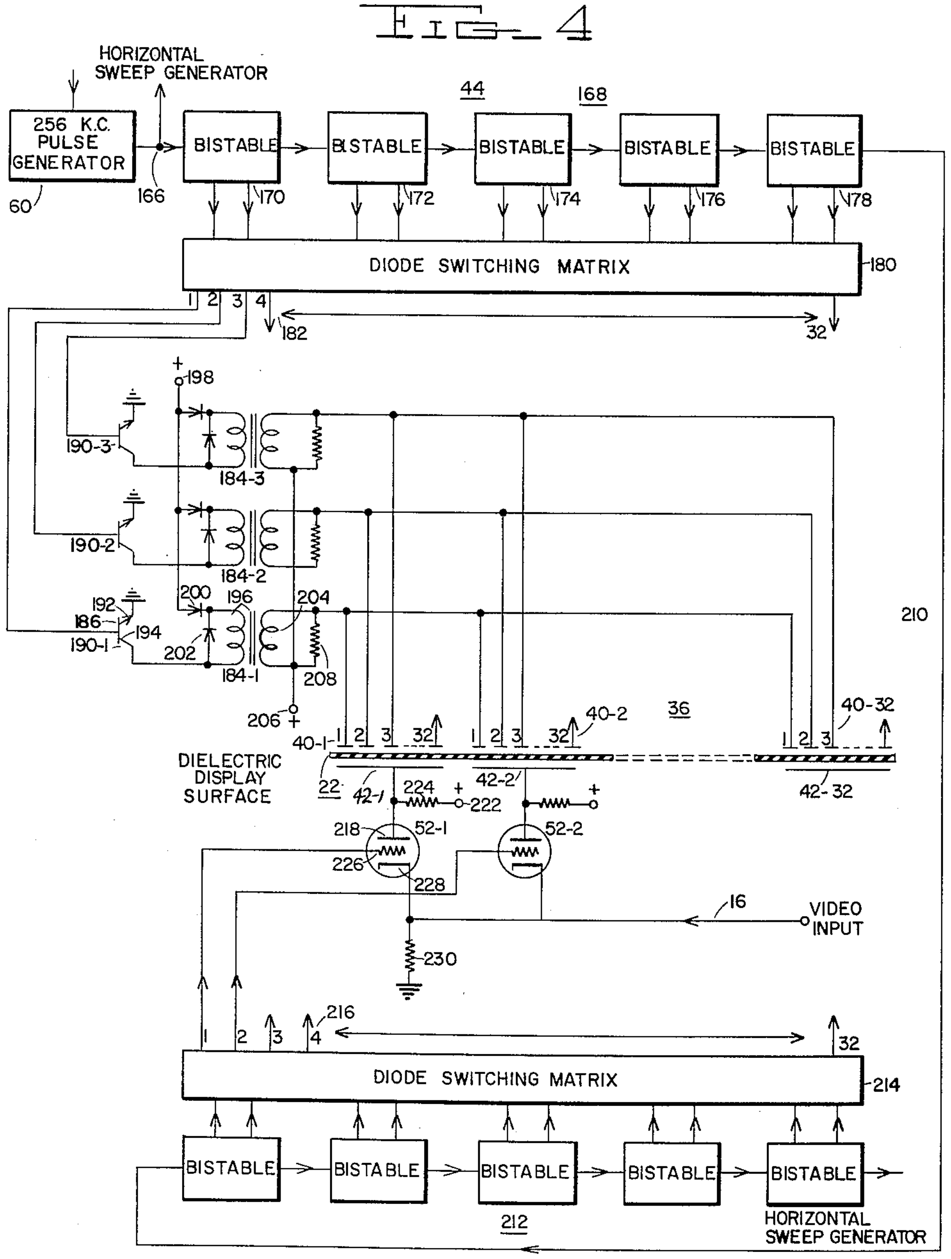
FIG. 4 is a schematic illustration showing the preferred embodiment of the dot-switches employed in FIGS. 1 and 3.

Referring now to FIG. 4, there is shown the preferred embodiment of dot switch 44, it being understood that dot switch 46 is identical. In the specific embodiment shown, writing head 36 associated with dot switch 44 provides 1,024 individual dots equally spaced apart in a straight horizontal line across the width of the dielecetric belt 22. These dots must be sequentially turned on and off from left to right across the display at the rate of 256,000 dots per second to provide a horizontal sweep rate of 250 lines per second. During the time of each sequential actuation of the 1,024 dots, the dielectric material belt 22 is moved vertically in the direction 34 (FIG. 1) at a constant rate by drive motor 32 so that each successive line is printed just below its predecessor, much in the manner of a television raster.

In order to accomplish the successive sequential switching of the 1,024 individual printing elements, pulse generator 60 is a stable 256 kc. pulse generator, i.e., it provides 256,000 timing pulses per second. The output circuit 166 of pulse generator 60 is coupled to the input of a five-stage binary counter 168 formed of five bistable multivibrators 170, 172, 174, 176 and 178. Binary counter 168 is in turn coupled to a diode switching matrix 180 which employs ninety-six diodes sequentially to pulse 32 output circuits on and off. The five stage binary counter 168 and diode switching matrix 180 do not form a part of my invention, per se, being shown and described in the Proceedings of the Institute of Radio Engineers, volume 37, February 1949, pages 139–147.

Electrodes 40 of writing head 36 comprise 1,024 individual dot forming electrodes divided into thirty-two groups of thirty-two electrodes. The electrodes of each group of electrodes 40 are respectively connected in parallel, as shown, i.e., electrodes #1 of all of the thirty-two groups are connected in parallel, electrodes #2 of all of the thirty-two groups are connected in parallel, etc.

It will be seen that the counter 168 and diode switching matrix 180 provides a pulse output sequentially on each of the thirty-two output circuits 182 of switching matrix 180, i.e., the first pulse received from pulse generator 60 in essence appears on the first output circuit 182—1 of matrix 180, the second pulse of the pulse generator 60 appears on the second output circuit 182—2, etc. The thirty-two output circuits 182 of the diode switching matrix 180 are respectively connected to the thirty-two parallel connected electrodes 40 of writing head 36 by pulse transformers 184 which provide the desired positive voltage pulses on the electrodes 40. Thus, output circuit 182—1 from the switching matrix 180 is coupled to base 186 of transistor 190—1 which has its emitter 192 connected to ground, and its collector 194 coupled to one end of primary winding 196 of transformer 184—1. The other end of primary winding 196 is connected to a suitable source 198 of positive potential by diode 200, and another diode 202 is coupled across primary winding 196 of transformer 184—1. Secondary winding 204 of transformer 184—1 has one end connected to a suitable source 206 of positive potential and has resistor 208 connected thereacross. The other side of secondary winding 204 is connected to the number one electrode of each of the thirty-two groups of electrodes 40. The other output circuits 182 of the diode switching matrix 180 are similarly connected to the respective electrodes 40 by transistors 190—2, 190—3 and pulse transformers 184—2 and 184—3, as shown. Positive going pulses are thus sequentially applied to the thirty-two electrodes 40 of all of the groups of electrodes, these pulses being of such amplitude that the dielectric belt 22 will be incrementally charged in dot form when a negative pulse of suitable amplitude is applied to the opposite side of the belt by the other electrodes 42.

The final output of the binary counter 168 which is an 8 kc. pulse train in line 210 is coupled to the input of another binary counter 212 and diode switching matrix 214, identical respectively to counter 168 and diode matrix 180. Electrodes 42 on the other side of belt 22 from electrodes 40 comprise thirty-two electrodes respectively associated with the thirty-two groups of thirty-two electrodes 40. Thus, the first electrode 42—1 cooperates with the thirty-two electrodes of the first group of electrodes 40—1, the second electrode 42—2 cooperates with the thirty-two electrodes of the second group of electrodes

40—2, etc. The thirty-two output circuits 216 of diode matrix 214 are respectively coupled to the thirty-two electrodes 42 by gate tubes 52. Each of the gate tubes 52 has its plate 218 coupled to a suitable source 222 of positive plate potential by plate resistor 224 and to the respective electrode 42. The control grid 226 of each of the gate tubes 52 is coupled to the respective output circuit 216 of the diode switching matrix 214, and the cathode 228 is connected to ground by cathode resistor 230. All of the cathodes 228 of the thirty-two gate tubes 52 are connected to the output circuit 16 of the first color clipper 158 (the cathodes of the gate tubes 52 of the other dot switch 46 are coupled to delay circuit 64).

It will now be seen that the video information from the storage tube 126, as separated into its two-color components by the clipping circuits 158 and 160, is coupled to the cathodes 226 of the gate tubes 52 of the two dot switches 44 and 46 during writing operation. Referring to the first color dot switch 44, when a black mark is to be printed on the dielectric belt 22, the video information applied to the cathodes 228 is negative and therefore the respective tube 52 is keyed on by the positive-going pulse applied to the respective grid 226 from the respective output circuit 216 of the diode matrix 214 so that the respective tube 52 conducts heavily, thereby applying to belt 22 a negative pulse with respect to the pulses applied by the electrodes 40. When, on the other hand, a black mark is not to be printed, the video signal in output circuit 16 from the first clipper 158 is essentially zero and therefore the respective tube 52 will not be gated on, even in the presence of a positive pulse applied to its grid 226 from the respective output circuit 216 of the diode switching matrix 214.

As previously indicated, pulse generator 60 is coupled to horizontal sweep generator 74 in order to initiate the horizontal scanning sweep supplied to horizontal deflection element 142 of storage tube 126 during read-out operation, and the final output of binary counter 212 is also applied to horizontal sweep generator 74 in order to initiate a new horizontal sweep responsive to completion of the pulse count of 1,024.

It will be understood that the system shown in FIG. 3 and the counting and switching apparatus shown in FIG. 4 are not my invention, per se, but form a part of my improved two-color large area display system.

While I have described above the principles of my invention in connection with specific apparatus, it is to be clearly understood that this description is made only by way of example and not as a limitation to the scope of my invention.

What is claimed is:

1. A system for large area display of information in two colors comprising: means for receiving said information and for converting the same into two time-based signals respectively responsive to the information in said two colors; a relatively thin sheet of transparent dielectric material; means including a first plurality of electrodes in spaced apart alignment along one dimension of said sheet and cooperating therewith to form first incremental electrostatic charges thereon in dot form when said first electrodes are respectively pulsed; means including a second plurality of electrodes in spaced apart alignment along said one dimension of said sheet and cooperating therewith to form second incremental electrostatic charges thereon in dot form when said second electrodes are respectively pulsed, said second plurality of electrodes being spaced from said first plurality along the other dimension of said sheet; means for moving said sheet with respect to said first and second electrodes along said other dimension; first switching means sequentially coupling said first electrodes to said converting means for sampling one of said signals at discrete intervals and for pulsing said first electrodes responsive to the presence of said one signal at the respective intervals; second switching means sequentially coupling said second electrodes to said converting means for sampling the other of said signals at discrete intervals and for pulsing said second electrodes responsive to the presence of said other signal at the respective intervals; first means for applying charged toner material of one color to one side of said sheet following said first electrodes; and second means for applying charged toner material of the other color to the other side of said sheet following said second electrodes.

2. The combination of claim 1 in which said second switching means is coupled to said converting means by signal delay means for delaying the other signal for a time equal to the time required for a point on said sheet to move along said other dimension from said first electrodes to said second electrodes.

3. The combination of claim 1 in which said dielectric sheet is in the form of an endless belt; and in which said first and second pluralities of electrodes are stationary and said belt is moved transversely with respect thereto.

4. A system for large area display of information in two colors comprising: means for receiving said information and for converting the same into a first time-based signal having characteristics respectively responsive to the information in said two colors; means for separating said first signal into second and third time based signals respectively responsive to said characteristics; a relatively thin sheet of transparent dielectric material; means including a first plurality of electrodes in spaced apart alignment along one dimension of said sheet and cooperating therewith to form first incremental electrostatic charges thereon in dot form when said first electrodes are respectively pulsed; means including a second plurality of electrodes in spaced apart alignment along said one dimension of said sheet and cooperating therewith to form second incremental electrostatic charges thereon in dot form when said second electrodes are respectively pulsed, said second plurality of electrodes being spaced from said first plurality along the other dimension of said sheet; means for moving said sheet with respect to said first and second electrodes along said other dimension; first switching means coupling said first electrodes to said separating means for sequentially sampling said second signal at discrete intervals and for pulsing said first electrodes responsive to the presence of said second signal at the respective intervals; signal delay means coupled to said separating means for delaying said third signal for a time equal to the time required for a point on said sheet to move along said other dimension from said first electrodes to said second electrodes; second switching means coupling said second electrodes to said signal delay means for sequentially sampling the delayed third signal at discrete intervals and for pulsing said second electrodes responsive to the presence of the delayed third signal at the respective intervals; first means for applying charged toner material of one color to one side of said sheet following said first electrodes; and second means for applying charged toner material of the other color to the other side of said sheet following said second electrodes.

5. The combination of claim 4 wherein said converting means converts said information into a first time-based signal having levels respectively responsive to the information in said two colors, and wherein said separating means comprises first and second clipping means for respectively clipping said first signal to provide said second and third signals respectively responsive to said two levels.

6. The combination of claim 4 in which said dielectric sheet is in the form of an endless belt trained around at least two rollers to provide at least two straight runs; in which said first and second plurality of electrodes are stationary and extend generally transversely across said belt; in which said moving means is coupled to one of said rollers thereby to move said belt transversely with respect to said first and second electrodes; in which said first electrodes cooperate with one run of said belt and said first toner applying means is disposed on the outer side of said belt and is spaced from said first electrodes in the direction of movement of said belt; in which said second electrodes cooperate with the other run of said belt and said second toner applying means is disposed on the inner side of said belt and is spaced from said second electrodes in the direction of movement of said belt; a portion of said belt spaced from said second toner applying means in the direction of movement of said belt forming a visual display surface; and further comprising means cooperating with said belt and spaced from said display surface in the direction of movement of said belt for erasing said incremental charges.

7. The combination of claim 4 wherein each of said switching means comprises gate means and means for sequentially connecting the respective electrodes to said gate means responsive to actuating pulses, said gate means being respectively coupled to said separating means and said delay means and respectively coupling said sequential connecting means to a source of potential responsive to the presence of the respective second and third signals thereby pulsing said electrodes; pulse generating means directly coupled to the connecting means of said first switching means for supply said actuating pulses thereto; and second signal delay means having the same delay as said first-named delay means and coupling said pulse generating means to the connecting means of said second switching means.

8. A system for large-area display of information in two colors comprising: means for receiving said information and converting the same into a first time-based signal having characteristics respectively responsive to the information in said two colors, said converting means providing said first signal in raster form having horizontal and vertical time components; horizontal and vertical sweep generating means respectively coupled to said converting means for providing said horizontal and vertical time components; means for separating said first signal into second and third time-based signals respectively responsive to said color characteristics; a relatively thin sheet of transparent dielectric material; means including a first plurality of electrodes in spaced apart alignment along one dimension of said sheet cooperating therewith to form first incremental electrostatic charges thereon in dot form when said first electrodes are respectively pulsed; means including a second plurality of electrodes in spaced apart alignment along said one dimension of said sheet and cooperating therewith to form second incremental electrostatic charges thereon in dot form when said second electrodes are respectively pulsed, said second plurality of electrodes being spaced from said first plurality along the other dimension of said sheet; means for moving said sheet with respect to said first and second electrodes along said other dimensions; first switching means coupling said first electrodes to said separating means for sequentially sampling said second signal at discrete intervals and for pulsing said first electrodes responsive to the presence of said second signal at the respective interval; signal delay means coupled to said separating means for delaying said third signal for a time equal to the time required for a point on said sheet to move along said other dimension from said first electrodes to said second electrodes; second switching means coupling said second electrodes to said signal delay means for sequentially sampling the delayed third signal at discrete intervals and for pulsing said second electrodes responsive to the presence of the delayed third signal at the respective intervals; each of said switching means comprising gate means and means for sequentially connecting the respective electrodes to said gate means responsive to actuating pulses, said gate means being respectively coupled to said separating means and said delay means and respectively coupling said sequential connecting means to a source of potential responsive to the presence of the respective second and third signals thereby pulsing said electrodes; pulse generating means directly coupled to the connecting means of said first switching means for supplying said actuating pulses thereto; second signal delay means having the same delay as said first-named delay means and coupling said pulse generating means to the connecting means of said second switching means; said pulse generating means being coupled to said horizontal sweep generating means for synchronizing the same; said moving means being coupled to said vertical sweep generating means for synchronizing the same; first means for applying charged toner material of one color to one side of said sheet following said first electrodes; second means for applying charged toner material of the other color to the other side of said sheet following said second electrodes; and means cooperating with said sheet for erasing said charged toner material therefrom.

9. The combination of claim 8 wherein said information is alpha-numeric in form and coded as to character, position, and color; and in which said receiving and converting means comprises code identifying means for receiving the coded information and for separating the character, position and color codes; character generator means coupled to said code identifying means for providing character signals responsive to the character code; means coupled to said code identifying means for generating position signals responsive to the position code; means coupled to said code identifying means for generating first and second color signals responsive to the color code; a signal-to-signal storage tube having beam producing means, beam intensity control means, a storage electrode, a writing signal input circuit, an output circuit, and beam deflecting means; means coupled to said storage tube for selectively changing the same from writing to reading operation, said changing means coupling said character generator means to said writing signal input circuit, coupling said positional signal generating means to said deflecting means, and said color signal generating means to said beam intensity control means during writing operation thereby impressing said character signal on said storage electrode at locations responsive to said position signals and at levels responsive to said color signals; said changing means coupling said horizontal and vertical sweep generating means to said deflecting means during reading operation for scanning said beam over said storage electrode thereby to provide said first time-based signal in said output circuit having two levels respectively responsive to said color code; said output circuit being coupled to said separating means; and in which said separating means comprises two clipping means for respectively clipping said first signal to provide said second and third signals respectively responsive to said two levels.

References Cited in the file of this patent

UNITED STATES PATENTS 2,752,833 Jacob ---------------------- July 3, 1956